United States Patent
Muttik et al.

(10) Patent No.: US 7,024,432 B2
(45) Date of Patent: Apr. 4, 2006

(54) UPDATING COMPUTER FILES ON WIRELESS DATA PROCESSING DEVICES

(75) Inventors: Igor Muttik, Berkhamstead (GB); Vincent Paul Gullotto, Beaverton, OR (US); Khai Pham, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 636 days.

(21) Appl. No.: 09/918,538

(22) Filed: Aug. 1, 2001

(65) Prior Publication Data

US 2003/0028542 A1 Feb. 6, 2003

(51) Int. Cl.
*G06F 17/30* (2006.01)

(52) U.S. Cl. .......................... 707/203; 707/10

(58) Field of Classification Search ................ 707/1–3, 707/9–10, 100–104.1, 200–205, 8, 206, 108, 707/114, 116, 136, 140, 151, 153; 709/200, 709/217–220, 201, 225, 227; 714/1–6, 15; 455/422.1, 456.1–457; 717/100, 106, 108, 717/114, 116, 136, 140, 151, 153

See application file for complete search history.

(56) References Cited

U.S. PATENT DOCUMENTS

| | | | | |
|---|---|---|---|---|
| 5,406,484 A | | 4/1995 | Wurzenberger | 455/456.1 |
| 5,826,265 A | * | 10/1998 | Van Huben et al. | 707/8 |
| 6,085,276 A | * | 7/2000 | VanDoren et al. | 710/240 |
| 6,393,438 B1 | * | 5/2002 | Kathrow et al. | 707/203 |
| 6,598,060 B1 | * | 7/2003 | Goldick | 707/203 |
| 2003/0165128 A1 | * | 9/2003 | Sisodia et al. | |

FOREIGN PATENT DOCUMENTS

EP    1 049 346    11/2000
JP    2001-53882    2/2001

* cited by examiner

*Primary Examiner*—Greta Robinson
*Assistant Examiner*—Harold E. Dodds, Jr.
(74) *Attorney, Agent, or Firm*—Zilka-Kotab, PC; Christopher J. Hamaty

(57) ABSTRACT

A wireless data processing device 2 stores partially completed versions of a file needed to replace a current version of a file used by that target device 2. When a device storing a more up-to-date version of the file than the current complete version stored by the target device 2 moves into range, downloading of that new version either completely, or resuming from a previously reached point, is initiated. When the in-range device has more than one version of the file that could be downloaded, the version selected for initial download may be the one which will take least time to complete.

24 Claims, 2 Drawing Sheets

UPDATING COMPUTER FILES ON WIRELESS DATA PROCESSING DEVICES

BACKGROUND OF THE INVENTION

1. Field of the Invention

This invention relates to data processing systems. More particularly, this invention relates to the updating of computer files on data processing devices having wireless communication links with other data processing devices.

2. Description of the Prior Art

Data processing devices having wireless communication links with other data processing devices are becoming increasingly common. Examples of such devices are wireless connected notebook or laptop PCs, PDAs, smartphones and the like. Computer files stored on these wireless connected devices and used by them may require regular updating. An example of such files are computer virus definition data files and computer virus scanning engine files. Such files require regular updating to remain properly effective.

With permanently connected data processing devices, such as conventional PCs connected by wired networks, relatively reliable and systematic update mechanisms and procedures may be put into place. However, wireless connected devices are generally subject to a more ad-hoc nature of connection and in some cases may never be connected to an individual other device for a sufficient period of time to enable a conventional updating mechanism and strategy to be effective.

SUMMARY OF THE INVENTION

Viewed from one aspect the present invention provides a computer program product for controlling a target data processing device to update a current version of a file stored on a target data processing device, said computer program product comprising:

link forming logic operable to form a wireless communication link with an in-range data processing device storing a more up-to-data version of said file;

portion determining logic operable to determine if a portion of said more up-to-date version of said file is already stored within said target data processing device within a store of portions of one or more different more up-to-date versions of said file;

downloading logic operable to download said more up-to-date version of said file from said in-range data processing device following on from any portion of said more up-to-date version of said file already stored within said store; and when a full copy of said more up-to-date version of said file is stored on said target data processing device, version replacing logic operable to replace said current version of said file with said more up-to-date version of said file to form a new current version of said file and to discard from said store any portions of less up-to-date versions of said file than said new current version of said file.

The invention recognises that in the case of wireless connected data processing devices a different approach to the updating mechanism needs to be taken in order to deal with the situation that such devices are often only connected for short periods of time and at irregular intervals. Accordingly, the invention provides the ability to store portions of updates as and when they become available from the various in-range source devices that the target device may encounter and seek to complete these partial stored downloads when the opportunity arises. Since it cannot be guaranteed that the in-range devices the target device may encounter will all contain a common more up-to-date version of the file it is required to download, the target device is provided with the ability to store portions of a plurality of different more up-to-date versions such that the first of these to be completed can be used. Less up-to-date partially downloaded versions can at that stage be discarded as they will not subsequently be needed.

Whilst it will be appreciated that the technique can be applied to a wide variety of computer files, such as for example corporate database type files, the invention is of particularly utility in the field of anti-virus protection where the file may be an anti-computer virus definition data file or a computer anti-virus scanning engine file.

It may be that the target device encounters an in-range device that does not itself have a full copy of a more up-to-date version of a desired computer file, but instead only has a portion of that computer file. Nevertheless, the target device may choose to download that portion of the more up-to-date computer file as it is available and then seek to complete that download from a different device at a later time.

It may be that the in-range device is storing a plurality of versions of the desired computer file. A preferred strategy may be to start the downloading to the target device with the version of the computer file that will take least time to download to form a complete copy of that version of the computer file on the target device. In this way, the target device can seek to increase its chances of making at least some progress in its update status even if the connection time with the in-range device is short.

It will be appreciated that the amount of storage capacity available on a typical wireless data processing device is relatively limited and accordingly the management of available storage space for use in this updating mechanism is a significant consideration. Accordingly, preferred embodiments of the invention include mechanisms for discarding partially completed versions of a computer file based upon one or more of the age of the computer file and the amount of data needing to be downloaded to complete that computer file.

In order to resist malicious interference with this downloading mechanism, particularly in the context of anti-virus systems, preferred embodiments of the invention authenticate the downloading process using digital signatures.

It will be appreciated that a particular in-range device may itself be communicating with a further device which is not an in-range device to the target device. In this context the in-range device communicating with the target device can effectively act as a data relay and can signal the target device that it is currently updating to a more up-to-date version of a file from a further device such that the target device may select that currently downloading version to itself download as parts or all of it become available.

It will be appreciated that the updating could be bi-directional and that two wireless connected devices could each have different computer files that are more up-to-date than the corresponding computer files stored upon the other device. In this circumstance the devices can exchange updates.

As well as providing a computer program for controlling processing operation in accordance with the above techniques, the invention also provides a method of updating a file and an apparatus for updating a file.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
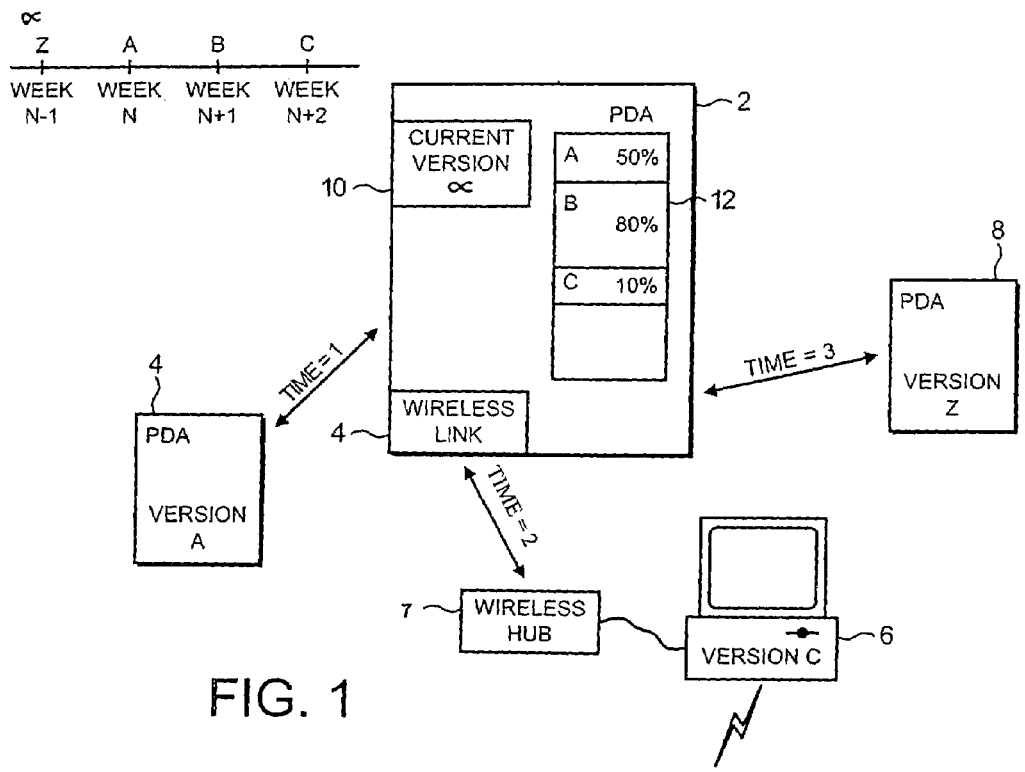
FIG. 1 schematically illustrates a target data processing device connected at different times to different in-range devices storing different versions of a computer file.

FIG. 1 illustrates a target wireless data processing device in the form of a PDA 2. The target device 2 includes a wireless link 4 for connecting to similarly equipped other devices. At different points in time the target device 2 may be connected to an in-range PDA 4, a PC 6 connected via a wireless hub 7 and a further in-range PDA 8.

The target device 2 includes a memory 10 for storing a current version α of a computer file to be updated, such as an anti-computer virus definition data file or an anti-computer virus scanning engine file.

The target device 2 also includes a memory 12 (this may be a different portion of the same memory as forms memory 10 or a separate memory) for storing partially completed more up-to-date versions of the computer files stored within the memory 10. In this example, the target device 2 has managed to download 50% of a version A from the in-range PDA device 4, and 10% of the version C from the PC 6. The target device 2 was connected via a wireless link to these different devices at different times. At another time, the target device 2 was connected to the further in-range PDA device 8, but since this only stored a less up-to-date version ≠of the computer file, than that already held in complete form within memory 10 by the target device 2, no download was made from the further in-range PDA device 8.

Figure 2:
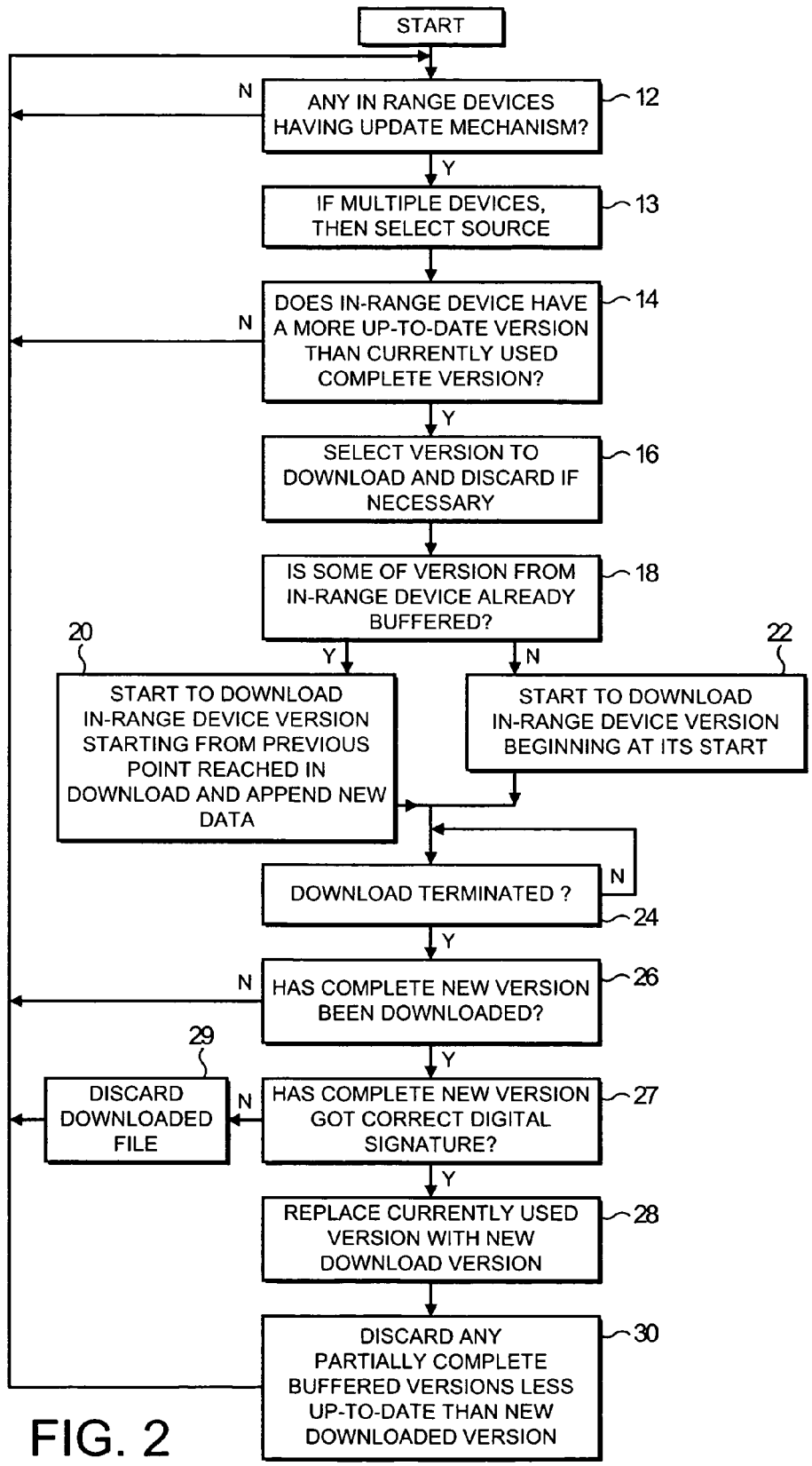
FIG. 2 is a flow diagram illustrating the processing that may be performed by the target data processing device.

FIG. 2 is a flow diagram illustrating the processing performed by the target device 2. At step 12 the target device waits for connection to be established with an in-range device that is also running the update mechanism. When such a link is made, step 13 checks if more than one other device is in range (e.g. at start-up multiple other devices may be encountered), and if so then selects a device for further interaction. The selection may be based on various criteria, such as the transfer speed of the connection, an estimate of the connection lifetime (e.g. based upon history information or information provided by the other device) or which device has the preferred file for download (as discussed later). Step 14 determines whether or not that in-range device has a more up-to-date version of the currently used complete version of the file stored in the memory 10. If the in-range device does not have a more up-to-date version, then processing returns to step 12. If a more up-to-date version is available in at least partial form within the in-range device, then processing proceeds to step 16.

Step 16 determines whether more than one version of the file to be downloaded is present within the in-range device. If more than one version is present, then a selection as to which version should be downloaded first is made. This selection may be made to select the version which will take least time to download to the target device to form a complete more up-to-date version within the target device based upon those portions of the computer file already stored within the target device. Alternatively, a different strategy may be selected whereby the most up-to-date version available within the in-range device is selected irrespective of whether or not any of that version is already stored within the target device or how long it is estimated that download of that most up-to-date version will take. The selection of the strategy to be used can be set dependent upon corporate or individual user preferences.

Step 16 also serves to discard any currently partially downloaded portions of the file that may be necessary in order to make room within the memory 12 for the now to be downloaded new data. Again, different strategies may be used to select which data should be discarded. A simple strategy may discard the data relating to the least up-to-date version. Another strategy may replace or modify this strategy based upon the amount of data needing to be downloaded to complete the different versions currently stored within the memory 12. These strategy selections may again be made in dependence upon user or corporate preferences.

At step 18 a determination is made as to whether or not some of the version of the file to be downloaded from the in-range device is already stored within the memory 12. If some is already stored, then processing proceeds to step 20 at which download is commenced from the previous point reached within the file and the new data appended to the previously downloaded data. Alternatively, if no portion of the file to be downloaded is already stored, then processing proceeds to step 22 at which a fresh download of the complete file is initiated.

Step 24 serves to monitor for the download being terminated. The download may be terminated because the end of the file has been reached. Alternatively, the download may be terminated because the target device moves out-of-range of the in-range device from which the download was being made. Step 26 determines whether a complete new version of the file has been downloaded. If a complete new version has not been downloaded, then processing proceeds to step 12.

If a complete new version has been downloaded as determined at step 26, then step 27 checks the digital signature on the downloaded file to check that it is authentic. If the file does not have the correct digital signature, then it is discarded at step 29 and processing returns to step 12. If the file does have the correct digital signature then step 28 serves to replace the currently used version stored within the memory 10 with the new downloaded version. Step 30 then discards any partially complete buffered versions stored within the memory 12 that are less up-to-date than the newly downloaded complete version. Such old partially complete versions will now not be needed since they would never be used to replace the more up-to-date version that has just been obtained in complete form. After step 30 processing returns to step 12.

A particular wireless device may be in-range with a first device, but out-of-range with a second device. In these circumstances, it may be possible for the first device to act as a relay to the second device. The first device may itself already be downloading a file from the second device that it can then pass on to the particular device. Alternatively, intermediate devices may act as simple relays (possibly bidirectional) of request for updating files among an extended network of devices even if the replaying device itself has no need for the files being requested.

Figure 3:
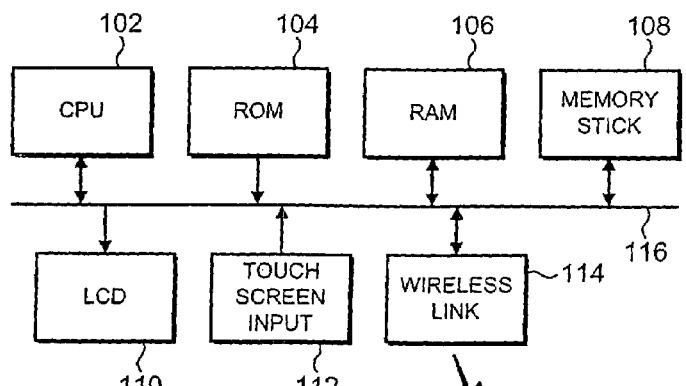
FIG. 3 schematically illustrates a general purpose wireless data processing device of the type that may be used to implement the above described techniques.

FIG. 3 highly schematically illustrates the general form of a wireless data processing device 100. The wireless data processing device 100 includes a central processing unit 102, a read only memory 104, a random access memory 106, a non-volatile memory 108, such as a memory stick, a LCD user display 110, a touch screen user input device 112 and a wireless communication device 114, such as a Bluetooth or 802.11 module. The various components of the wireless data processing device 100 are connected via a common bus 116.

In operation the central processing unit 102 executes computer program instructions stored within the read only memory 104, the random access memory 106 or the memory stick 108, or alternatively downloaded via the wireless link 114. The random access memory 106 may be used as working memory, as may the memory stick 108. The results of the data processing are displayed to a user via the LCD panel 110. Controlling user inputs are received via the touch screen input device 112 (or keyboard or stylus in alternative devices).

The computer program controlled operation of the general purpose wireless data processing device 100 can carry out the above described techniques and methods in accordance with known programming techniques. Various different programming languages may be used and different architectures of wireless data processing device employed. The computer program may be distributed on a recordable media or dynamically downloaded via a wireless link.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product for controlling a target data processing device to update a current version of a file stored on a target data processing device, said computer program product comprising:
   link forming logic operable to form a wireless communication link with an in-range data processing device storing a more up-to-date version of said file;
   portion determining logic operable to determine if a portion of said more up-to-date version of said file is already stored within said target data processing device within a store of portions of one or more different more up-to-date versions of said file;
   downloading logic operable to download said more up-to-date version of said file from said in-range data processing device following on from any portion of said more up-to-date version of said file already stored within said store; and
   when a full copy of said more up-to-date version of said file is stored on said target data processing device, version replacing logic operable to replace said current version of said file with said more up-to-date version of said file to form a new current version of said file and to discard from said store any portions of less up-to-date versions of said file as they will not subsequently be needed.

2. A computer program product as claimed in claim 1, wherein said file is one of:
   (i) an anti-computer virus definition data file; and
   (ii) a computer anti-virus scanning engine file.

3. A computer program product as claimed in claim 1, wherein if said in-range data processing device is storing a portion of said more up-to-date version of said file, then said downloading logic is operable to download said portion of more up-to-date version of said file to said target data processing device.

4. A computer program product as claimed in claim 1, wherein if said in-range data processing device is storing more than one more up-to-date version of said file, then said downloading logic is operable to download first that more up-to-date version of said file for which it will take least time to complete a full copy upon said target data processing device.

5. A computer program product as claimed on claim 1, comprising discard selection logic operable to select portions of a more up-to-date version of said file from said store are selected for discarding from said store based upon one or more of:
   (i) age; and
   (ii) amount of data needing to be downloaded to complete said version of said file.

6. A computer program product as claimed in claim 1, comprising authentication logic operable to authenticate a download from an in-range data processing device using a digital signature.

7. A computer program product as claimed in claim 1, wherein said in-range data processing device transmits to said target data processing device information regarding a currently progressing downloading of a version of said file to said in-range data processing device such that said target device may select said version of said file currently being downloaded to said in-range data processing device for downloading to said target data processing device.

8. A computer program product as claimed in claim 1, wherein said in-range data processing device also downloads a file from said target data processing device.

9. A method of updating a current version of a file stored on a target data processing device, said method comprising:
   forming a wireless communication link with an in-range data processing device storing a more up-to-data version of said file;
   determining if a portion of said more up-to-date version of said file is already stored within said target data processing device within a store of portions of one or more different more up-to-date versions of said file;
   downloading said more up-to-date version of said file from said in-range data processing device following on from any portion of said more up-to-date version of said file already stored within said store; and
   when a full copy of said more up-to-date version of said file is stored on said target data processing device, replacing said current version of said file with said more up-to-date version of said file to form a new current version of said file and discarding from said store any portions of less up-to-date versions of said file as they will not subsequently be needed.

10. A method as claimed in claim 9, wherein said file is one of:
    (i) an anti-computer virus definition data file; and
    (ii) a computer anti-virus scanning engine file.

11. A method as claimed in claim 9, wherein if said in-range data processing device is storing a portion of said more up-to-date version of said file, then said portion of more up-to-date version of said file is downloaded to said target data processing device.

12. A method as claimed in claim 9, wherein if said in-range data processing device is storing more than one more up-to-date version of said file, then said target data processing device downloads first that more up-to-date version of said file for which it will take least time to complete a full copy upon said target data processing device.

13. A method as claimed on claim 9, wherein portions of a more up-to-date version of said file from said store are selected for discarding from said store based upon one or more of:
(i) age; and
(ii) amount of data needing to be downloaded to complete said version of said file.

14. A method as claimed in claim 9, wherein a download from an in-range data processing device is authenticated using a digital signature.

15. A method as claimed in claim 9, wherein said in-range data processing device transmits to said target data processing device information regarding a currently progressing downloading of a version of said file to said in-range data processing device such that said target device may select said version of said file currently being downloaded to said in-range data processing device for downloading to said target data processing device.

16. A method as claimed in claim 9, wherein said in-range data processing device also downloads a file from said target data processing device.

17. Apparatus for updating a current version of a file stored on a target data processing device, said apparatus comprising:
a link former operable to form a wireless communication link with an in-range data processing device storing a more up-to-data version of said file;
a portion determination unit operable to determine if a portion of said more up-to-date version of said file is already stored within said target data processing device within a store of portions of one or more different more up-to-date versions of said file;
a download unit operable to download said more up-to-date version of said file from said in-range data processing device following on from any portion of said more up-to-date version of said file already stored within said store; and
when a full copy of said more up-to-date version of said file is stored on said target data processing device, a version replacing unit is operable to replace said current version of said file with said more up-to-date version of said file to form a new current version of said file and to discard from said store any portions of less up-to-date versions of said file as they will not subsequently be needed.

18. Apparatus as claimed in claim 17, wherein said file is one of:
(i) an anti-computer virus definition data file; and
(ii) a computer anti-virus scanning engine file.

19. Apparatus as claimed in claim 17, wherein if said in-range data processing device is storing a portion of said more up-to-date version of said file, then said downloading unit is operable to download said portion of more up-to-date version of said file to said target data processing device.

20. Apparatus as claimed in claim 17, wherein if said in-range data processing device is storing more than one more up-to-date version of said file, then said downloading unit is operable to download first that more up-to-date version of said file for which it will take least time to complete a full copy upon said target data processing device.

21. Apparatus as claimed on claim 17, comprising a discard selector operable to select portions of a more up-to-date version of said file from said store are selected for discarding from said store based upon one or more of:
(i) age; and
(ii) amount of data needing to be downloaded to complete said version of said file.

22. Apparatus as claimed in claim 17, comprising an authentication unit operable to authenticate a download from an in-range data processing device using a digital signature.

23. Apparatus as claimed in claim 17, wherein said in-range data processing device transmits to said target data processing device information regarding a currently progressing downloading of a version of said file to said in-range data processing device such that said target device may select said version of said file currently being downloaded to said in-range data processing device for downloading to said target data processing device.

24. Apparatus as claimed in claim 17, wherein said in-range data processing device also downloads a file from said target data processing device.

* * * * *